United States Patent [19]

Papuchon et al.

[11] Patent Number: 4,927,245
[45] Date of Patent: May 22, 1990

[54] FREQUENCY SHIFTER FOR MEDIUM INFRARED RANGE WAVE

[75] Inventors: Michel Papuchon, Massy; Jean-Paul Pocholle, Arpajon; Dominique Delacourt, Paris, all of France

[73] Assignee: Thomson-CSF, Paris, France

[21] Appl. No.: 238,123

[22] Filed: Aug. 30, 1988

[30] Foreign Application Priority Data

Sep. 1, 1987 [FR] France .................. 87 12156

[51] Int. Cl.$^5$ .................. G02B 5/18; G02B 6/34; G02F 1/23
[52] U.S. Cl. .................. 350/354; 350/1.1; 350/96.19; 350/162.17
[58] Field of Search .................. 350/162.11, 162.17, 350/162.2, 162.24, 1.1, 354, 96.19

[56] References Cited

U.S. PATENT DOCUMENTS 3,790,252 2/1974 Pao .................. 350/354
4,508,431 4/1985 Henshaw .................. 350/354
4,540,244 9/1985 Sincerbox .................. 350/162.11

FOREIGN PATENT DOCUMENTS 0100418 2/1984 European Pat. Off. .

OTHER PUBLICATIONS

Morimoto et al., "A Picosecond Optical Gate Using Photo-Induced Grating"; Japanese Journal of Applied Physics, vol. 20, No. 6; Jun. 1981; pp. 1129-1133.
Journal of Soviet Laser Research, vol. 6, No. 4, Jul.-Aug. 1985, pp. 412-416, Vaitkus, et al.
Journal of the Optical Society of America B. Optical Physics, vol. 3, No. 2, Feb. 1986, pp. 306-313, Pauliat, et al.
Electronics Letters, vol. 19, No. 6, Mar. 17, 1983, pp. 234-235, Scholtz, et al.

Primary Examiner—Bruce Y. Arnold
Assistant Examiner—Terry S. Callaghan
Attorney, Agent, or Firm—Oblon, Spivak, McClelland, Maier & Neustadt

[57] ABSTRACT

A frequency shifter to shift the frequency of a guided wave in the medium infrared range comprises:
an optical guide, formed by semiconducting materials, on the surface of which a diffraction grating is created by carriers photo-induced by a periodic illumination.
standard optic means projecting, on the surface of the guide, two wave beams having different frequencies in the near infrared or visible range, to produce, by interference, a periodic illumination of the surface of the guide. This illumination induces photocarriers constituting a diffraction grating which is in translational motion at constant speed. This motion shifts the frequency of the diffracted wave by Doppler effect.

2 Claims, 1 Drawing Sheet

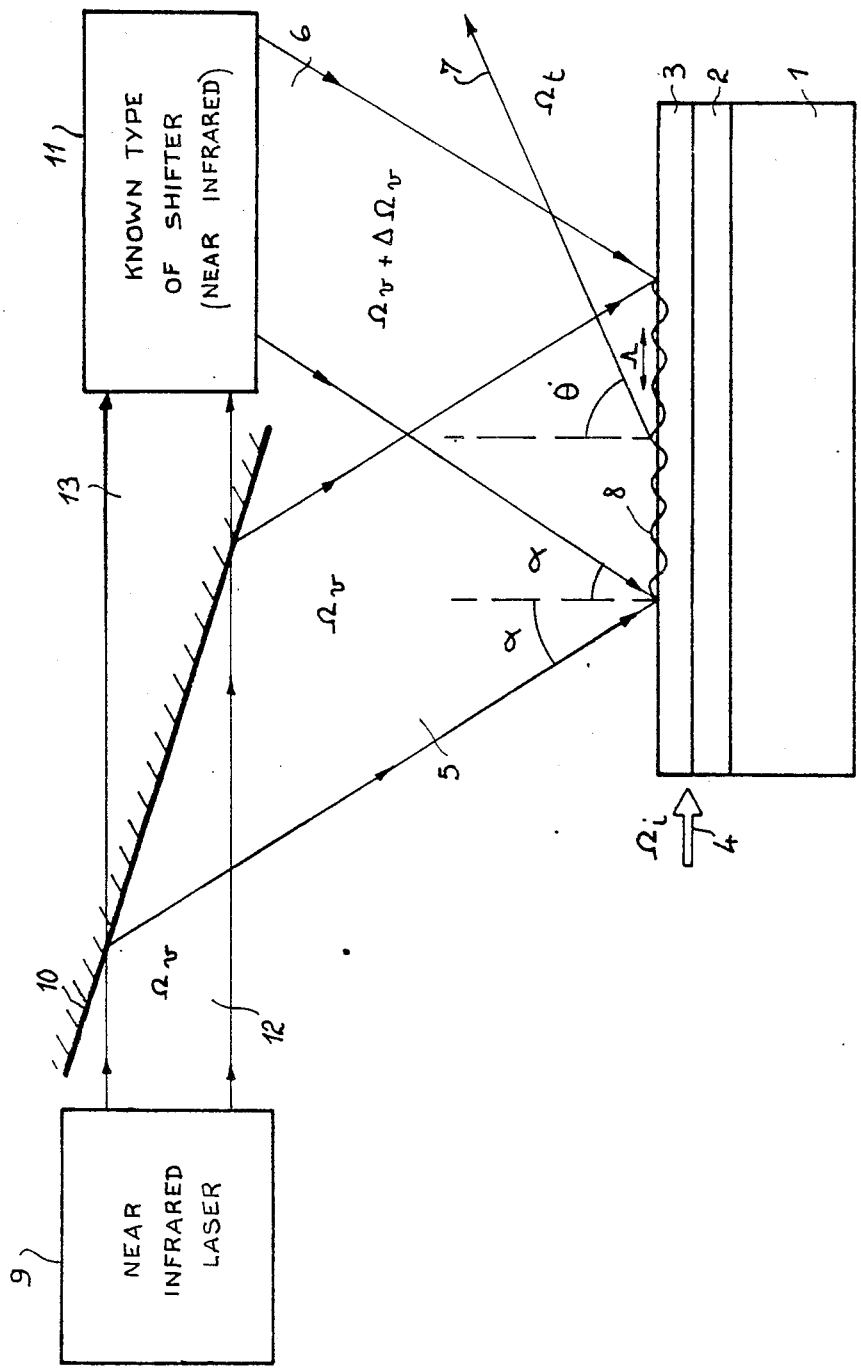

FREQUENCY SHIFTER FOR MEDIUM INFRARED RANGE WAVE

BACKGROUND OF THE INVENTION

1. Field of the Invention

The invention concerns a frequency shifter for a medium infrared range wave, i.e. one with a wavelength of more than three microns. A device of this type has many applications in systems for data transmission by frequency modulation, systems for coherent detection by hetrodyning etc. Standard shifters are either of the acousto-optical type, using an interaction between an optical wave and a diffraction grating in motion in the propagation medium of the wave, or of the type with rotating birefringent plates, the rotation being mechanical or electro-optical.

2. Description of the Prior Art

The most commonly used devices in the medium infrared range are of the acousto-optical type. A device of this type has a crystal which is mechanically coupled with an acoustic transducer. The vibrations produced by the transducer are propagated in the crystal, creating local variations in its refractive index. The propagation of these local variations constitutes a diffraction grating which shifts at a constant speed. The wave which has to have its frequency shifted is projected to the surface of the crystal where it is diffracted in undergoing a frequency shift by Doppler effect. A drawback of this type of shifter is that the diffracted wave has an angle of emergence which is a function of the value of the frequency shift. However, to cope with this drawback, it is possible to use prior art shifters, associating them, for example, in pairs.

The shifted wave is then no longer deflected but this does not eliminate a shift by the beam parallel to itself. This fact raises a great many problems in systems since this shift depends on the frequency variation undergone by the beam. Furthermore, the association of these shifters increases the complexity of systems.

The aim of the invention is to propose a frequency shifter, operating in the medium infrared range, which does not have these drawbacks and can be easily integrated into an optical device integrated in a semiconductor substrate.

SUMMARY OF THE INVENTION

An object of the invention is a frequency shifter comprising a diffraction grating in motion, created by photo-induction of carriers on the surface of an optic wave-guide integrated into a semiconductor. Prior art techniques enable the manufacturing of integrated optic guides which are relatively long, i.e. longer than one cm. The interference of two optical waves of different frequencies enables the creation, on the surface of this guide, of a relatively long diffraction grating which obtains high efficiency for the shifter in the medium infrared range.

According to the invention, a frequency shifter for waves in the medium infrared range comprises:
- a diffraction grating in motion to shift, by Doppler effect, the frequency of a wave applied to this grating;
- an optic guide, in which is guided the wave which has to undergo the frequency shift, formed by semiconducting materials and on the surface of which the diffraction grating is created by carriers photo-induced by periodic illumination.
- means to produce two wave beams and to make them interfere on the surface of the guide, said wave beams having different frequencies and belonging to the near or visible infrared range, to produce a periodic illumination in translational motion on the surface of the guide.

BRIEF DESCRIPTION OF THE DRAWING

The appended figure is a schematic view of an embodiment of the frequency shifter according to the invention.

DESCRIPTION OF A PREFERRED EMBODIMENT

In the prior art, use is made of a diffraction grating etched on the surface of an optic guide to couple this guide with the external environment. The grating deflects the energy of a guided wave, being propagated in the guide, outwards. In the appended figure, the preferred exemplary embodiment comprises an optic guide formed by a layer 3 of a first semi-conducting material and an intermediate layer 2 formed by a second semiconducting material, deposited by epitaxy on a semiconductor substrate 1.

The wave, for which the frequency is to be shifted, is a guided wave 4 which is applied parallel to the layers 3 and 2 to be guided by them. Its pulsation, $\Omega_i$, belongs to the medium infrared range. The layer 2 is an intermediate layer with an refractive index which is in between that of the layer 3 and that of the substrate 1, so as to confine the guided mode more efficiently. The materials and thicknesses of the layers 3 and 2 are chosen so that the losses of the guided mode, which is to be diffracted towards the outside of the guide 3, are as small as possible, close to the wavelength of the guided wave. Thus, the guided wave 4 can interact throughout the length of the guide 3. This length may be greater than one centimeter. Owing to this great length, it is possible to obtain high diffraction efficiency.

In this example, the losses of the transverse electric fundamental mode $TE_0$ are smaller than 1 dB/cm.

A laser diode 9 gives a coherent light beam 12, with a frequency $\Omega_v$, located in the near infrared range. This beam 12 is separated into two beams 5 and 19 by a semi-transparent plate 10. The beam 13 enters a known type of frequency shifter 11 operating in the near infrared range. The shifter 11 restores a beam 6 with a fixed pulsation $\Omega_v + \Delta\Omega_v$. The plate 10 and the shifter 11 project the light beam 5 with a pulsation $\Omega_v$ and the light beam 6 with a pulsation $\Omega_v + \Delta\Omega_v$ respectively on the external surface of the layer 3. These two pulsations are in the near infrared range.

The interference of the beams 5 and 6 at the surface of the layer 3 causes an non-uniform illumination with a value that varies periodically in space and time. This illumination generates local variations of the refractive index in the layer 3 and these variations constitute a diffraction grating 8 having a translational motion of constant speed. The diffraction grating deflects the energy of the wave 4 towards the outside of the guide 3, modifying its frequency by Doppler effect. The diffracted wave has an emergence angle $\theta$ with respect to the normal to the layer 3 and has a pulsation $\Omega_i + P.\Delta\Omega_v$, where P is the order of diffraction. In practice, the major part of the diffracted energy is contained in a diffracted beam 7 corresponding to the first order of diffraction.

In integrated optics, it is possible to use a shifter 11 comprising a LiNbO$_3$ monocrystal wherein a moving diffraction grating is produced by electro-optical effect. Or else, it is possible to use a phase modulator controlled by a voltage gradient. Both these types of devices are of standard construction in the near infrared or visible range.

The laser giving the two beams 5 and 6 has a wavelength in the near infrared or visible range, enabling the use of a semiconductor laser diode.

It can be shown that the angle $\theta$, in air, satisfies the following relationship:

$$\sin\theta = \frac{\beta}{k} + P \cdot \frac{\lambda_i}{\Lambda} \quad (1)$$

where $\lambda_i$ is the wavelength in vacuum of the wave 4 to be shifted; $\Lambda$ is the pitch of the grating 8; $\beta/k$ is the effective index of the propagation mode in the guide; P is the order of diffraction.

The value of the pitch of the grating 8 is determined by the angle of incidence $\alpha$ of the beams 5 and 6 on the layer 3 and by the wavelength $\Omega_\nu$ corresponding to the pulsation $\Omega_\nu$ of the beam 5, in accordance with the formula:

$$\Lambda = \frac{\lambda_\nu}{2\sin\alpha} \quad (2)$$

The pulsation $\Omega_\nu$ of the beam 5 and the pulsation $\Omega_\nu + \Delta\Omega_\nu$ of the beam 6 differ little from each other and belong to the near infrared range in this example. For these beams 5 and 6 to generate photocarriers in the semiconducting materials of the layer 3, these frequencies should be chosen in such a way that the energy corresponding to them is greater than the energy of the bandgap of the material of the layer 3.

It is shown that the diffracted beam 7 has a shifted pulsation $\Omega_t$ given by the following formula:

$$\Omega_t = \Omega_i + P \cdot \Delta\Omega_\nu \quad (3)$$

where P is the order of diffraction used and where $\Delta\Omega_\nu$ is the algebraic deviation of pulsation between the beams 5 and 6. It is thus possible to command a frequency shift towards the higher frequencies or towards the lower frequencies with a deviation which is a function of the frequency deviation between the beams 5 and 6.

If the mode of propagation is the TE0 mode, and if the order of diffraction used is the order $-1$, with a fixed angle $\theta$, the angle of incidence $\alpha$ of the beams 5 and 6 is then determined according to the formula:

$$\sin\alpha = \frac{\lambda_\nu}{2\lambda_i} (\beta o/k - \sin\theta) \quad (4)$$

wherein $\beta o/k$ is the effective index for the propagation mode TE$_o$; $\lambda_i$ is the wavelength, in vacuum, of the wave 4 for which the frequency has to be shifted; and $\lambda_\nu$ is the wavelength, in vacuum, of the beam 5 producing the interferences.

In one exemplary embodiment, to shift the frequency of a wave having a wavelength $\lambda_\nu = 10.6$ microns in vacuum, the optic guide may be formed by a layer 3 of Ga$_{0.47}$In$_{0.53}$As with an N$^-$ doping below $10^{15}$cm$^{-3}$ and by a layer 2 of InP with an N$^-$ type doping below $10^{15}$cm$^{-3}$. The substrate 1 may be formed by InP with an N$^+$ type doping equal to $2.10^{18}$cm$^{-3}$. The layers 3 and 2 each have a thickness of five microns. Their indices are, respectively, N$_3$=3.39 and N$_2$=3.04. The index of the substrate is N$_1$=2.6. The effective index of the TE$_o$ propagation mode is equal to 3.3. The wavelength of the beams 5 and 6 is below 1.8 microns, i.e. it is in the near infrared range.

This exemplary embodiment can give, for example, a relative frequency shift, of about $\pm 10^{-2}$%, close to the wavelength $\lambda_i = 10.6$ microns.

The invention is not restricted to the above-described exemplary embodiment. Many alternative embodiments are within the scope of those skilled in the art, for example as regards the choice of the semiconductor materials to make the optic guide. In another exemplary embodiment, the layer 3 may be formed of GaAs with low doping, the layer 2 may be formed of GaAlAs with low doping and the substrate may be formed of GaAs with high doping. The beams 5 and 6 have a wavelength equal to 0.85 microns, located in the near infrared.

The frequency shifter according to the invention can be applied inter alia in integrated optics.

What is claimed is:

1. A frequency shifter for waves in the medium infrared range, comprising:

a diffraction grating in motion to shift, by Doppler effect, the frequency of a wave applied to this grating;

an optic guide, in which is guided the wave which has to undergo the frequency shift, formed by semiconducting materials and on the surface of which the diffraction grating is created by carriers photoinduced by periodic illumination; and means to produce two wave beams and to make them interfere on the surface of the guide, said wave beams having different frequencies, belonging to the near or visible infrared range, to produce said periodic illumination in translational motion on the surface of the guide.

2. A frequency shifter according to claim 1 wherein the means to produce two wave beams and to cause them to interfere with each other comprise a semiconductor laser diode, emitting in the near infrared or visible range, and a prior art type of frequency shifter working in the near infrared or visible range.

* * * * *